J. STONE.
Sliding-Stem Valves.

No. 157,554. Patented Dec. 8, 1874.

WITNESSES:
A. W. Almqvist
A. F. Terry

INVENTOR:
Jabez Stone
BY
ATTORNEYS.

UNITED STATES PATENT OFFICE.

JABEZ STONE, OF WATERFORD, NEW YORK, ASSIGNOR TO GEORGE W. EDDY, OF SAME PLACE.

IMPROVEMENT IN SLIDING STEM-VALVES.

Specification forming part of Letters Patent No. 157,554, dated December 8, 1874; application filed November 7, 1874.

*To all whom it may concern:*

Figure 1:
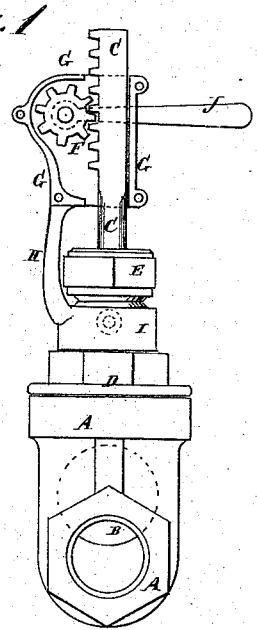
Figure 2:
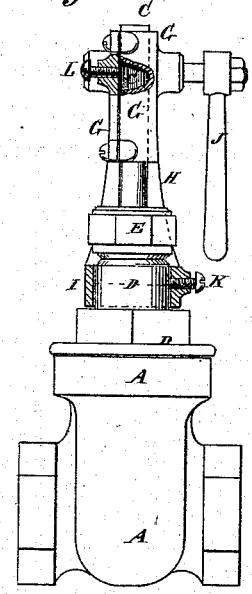
Figure 3:
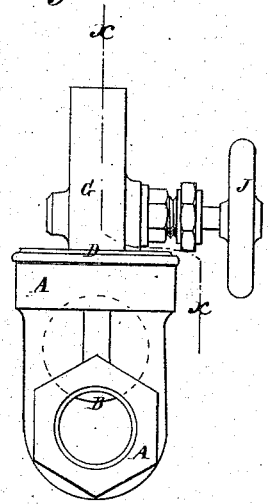
Figure 4:
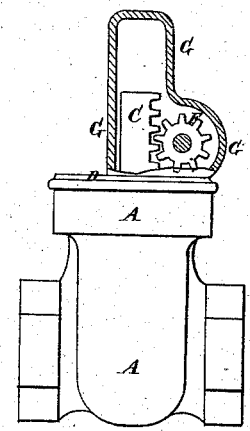

Be it known that I, JABEZ STONE, of Waterford, in the county of Saratoga and State of New York, have invented a new and useful Improvement in Sliding Stem-Valves, of which the following is a specification:

Figure 1 is a side view of my improved valve, a side plate of the gearing-chamber being removed. Fig. 2 is a front view of the same, part being broken away to show the construction. Fig. 3 represents a modification of the same. Fig. 4 is a detail section taken through the line $x\,x$, Fig. 3.

Similar letters of reference indicate corresponding parts.

My invention has for its object to furnish improved valves for steam, gas, water, oil, &c., which shall be so constructed that they may be opened and closed quickly, and that they may allow the hand-wheel, lever, or other handle to be adjusted in any position that will allow it to be most conveniently operated, the construction and arrangement of parts being as hereinafter described, and the novel features thereof as set forth in the claims.

A represents the valve casing or chamber, and B is the valve, about the construction of which parts there is nothing new. C is the valve-stem, which passes out through the cap D, and through a stuffing-box, E, connected with said cap D. Upon one side of the upper part of the valve-stem C are formed rack-teeth, into which mesh the teeth of the pinion F. The shaft of the pinion F works in bearings in the side plates of the chamber G, which incloses the pinion F, and through which the piston-stem C slides. One of the side plates of the gear-chamber G is detachable, to allow the pinion and its shaft to be conveniently inserted and detached when desired.

The gear-chamber G, which may be made in the form of a frame or socket, is formed upon the upper end of an arm, H, upon the lower end of which is formed a collar, I, which passes around a neck formed upon the upper part of the cap D, just below the stuffing-box E. This construction allows the stem C, chamber G, and collar I to be turned freely in any direction to bring the hand, wheel, lever, crank, or other handle, J, attached to the shaft of the pinion F, into any desired position to avoid obstructions, or to enable it to be conveniently reached by the engineer.

When the handle J has been adjusted in the desired position it is locked in place by the set-screw K, which passes through the collar I, and presses against the neck of the cap D, as shown in Fig. 2.

L is a set-screw, which passes in through a screw-hole in the side plate of the chamber G, and its forward end rests against the side of the stem C, to give friction enough to hold the valve raised or open. One end of the shaft of the pinion F works in a socket in one of the side plates of the chamber G, and its other end, to which the handle J is attached, passes out through a bearing or stuffing-box in the other side plate of said chamber.

If desired, the chamber G may be formed solid upon or securely bolted to the cap D, the arm H, collar I, and stuffing-box E being omitted. In this case the handle J may be brought into any desired position by turning the cap D in its seat in the case A. This may be done by interposing a washer or packing of the requisite thickness between the shoulder or flange of the cap D and the edge of the screw-hole in the casing or chest A, when the cap D is screwed into the said casing.

In the case of large valves the cap D, instead of being screwed into the casing A, may be secured to said casing by bolts, which bolts should be placed equally distant from each other, so that the position of the handle J may be adjusted by turning the cap D in its seat through the space of one or more bolt-holes, or, in case the cap D be made oblong, by turning it half around.

Having thus described my invention, I claim as new and desire to secure by Letters Patent—

1. The combination of the toothed valve-stem C, the pinion F, and axially-adjustable bracket-arm supporting said pinion, as shown and described.

2. The combination of the arm H and collar I with the cap D of a valve, the sliding stem of which is toothed, and is operated by a pinion, substantially as herein shown and described.

JABEZ STONE.

Witnesses:
 T. B. MOSHER,
 C. SEDGWICK.